US009789475B2

(12) United States Patent
Gao et al.

(10) Patent No.: US 9,789,475 B2
(45) Date of Patent: *Oct. 17, 2017

(54) ULTRA-STABLE RARE EARTH Y-TYPE MOLECULAR SIEVE AND PREPARATION METHOD THEREFOR

(75) Inventors: Xionghou Gao, Beijing (CN); Haitao Zhang, Beijing (CN); Zhengguo Tan, Beijing (CN); Di Li, Beijing (CN); Dong Ji, Beijing (CN); Hongchang Duan, Beijing (CN); Chenxi Zhang, Beijing (CN)

(73) Assignee: Petrochina Company Limited, Beijing (CN)

( * ) Notice: Subject to any disclaimer, the term of this patent is extended or adjusted under 35 U.S.C. 154(b) by 27 days.

This patent is subject to a terminal disclaimer.

(21) Appl. No.: 14/365,489

(22) PCT Filed: Apr. 13, 2012

(86) PCT No.: PCT/CN2012/000509
§ 371 (c)(1),
(2), (4) Date: Nov. 10, 2014

(87) PCT Pub. No.: WO2013/086768
PCT Pub. Date: Jun. 20, 2013

(65) Prior Publication Data
US 2015/0151284 A1 Jun. 4, 2015

(30) Foreign Application Priority Data

Dec. 15, 2011 (CN) .......................... 2011 1 0420931

(51) Int. Cl.
| *B01J 29/06* | (2006.01) |
| *C01B 39/24* | (2006.01) |
| *B01J 29/08* | (2006.01) |
| *C10G 11/05* | (2006.01) |
| *C01B 39/02* | (2006.01) |
| *B01J 35/02* | (2006.01) |
| *B01J 37/30* | (2006.01) |
| *B01J 35/10* | (2006.01) |

(52) U.S. Cl.
CPC ........... *B01J 29/088* (2013.01); *B01J 35/023* (2013.01); *B01J 37/30* (2013.01); *C01B 39/026* (2013.01); *C01B 39/24* (2013.01); *C10G 11/05* (2013.01); *B01J 35/10* (2013.01); *B01J 35/1085* (2013.01); *B01J 2229/186* (2013.01); *B01J 2229/40* (2013.01); *B01J 2229/42* (2013.01)

(58) Field of Classification Search
USPC ....... 502/73, 79, 85; 423/700, 701, 714, 715
See application file for complete search history.

(56) References Cited

U.S. PATENT DOCUMENTS

| 3,595,611 A | 7/1971 | McDaniel et al. |
| 4,218,307 A | 8/1980 | McDaniel |
| 4,584,287 A | 4/1986 | Ward |
| 5,340,957 A | 8/1994 | Clark |
| 2002/0094931 A1 | 7/2002 | Wang et al. |
| 2008/0261802 A1* | 10/2008 | Du .......................... C10G 11/05 502/65 |
| 2011/0224067 A1 | 9/2011 | Wormsbecher et al. |

FOREIGN PATENT DOCUMENTS

| CN | 1031030 A | 2/1989 |
| CN | 1217231 A | 5/1999 |
| CN | 1297018 A | 5/2001 |
| CN | 1075466 C | 11/2001 |
| CN | 1202007 C | 8/2003 |
| CN | 1506161 A | 6/2004 |
| CN | 1215905 C | 8/2005 |
| CN | 1676463 A | 10/2005 |
| CN | 1683474 A | 10/2005 |
| CN | 1307098 C | 3/2007 |
| CN | 1958452 A | 5/2007 |
| CN | 100344374 C | 10/2007 |

(Continued)

OTHER PUBLICATIONS

Lingping et al., Machine translation of CN 101284243, Oct. 2008.*
Search Report received in related CN Application No. 2011104209313 dated Dec. 9, 2015 and English translation.
First Office Action received in related CN Application No. 2011104209313 dated Jul. 23, 2014 and English translation.
Second Office Action received in related CN Application No. 2011104209313 dated Mar. 6, 2015 and English Translation.
Third Office Action received in related CN Application No. 2011104209313 dated Sep. 25, 2015 and English translation.
Extended European Search Report for Eurpean patent application No. 12857338 dated Jul. 21, 2015 (6 pages).

(Continued)

*Primary Examiner* — Elizabeth Wood
(74) *Attorney, Agent, or Firm* — Meunier Carlin & Curfman LLC

(57) ABSTRACT

The present invention provides an ultra-stable rare earth type Y molecular sieve and the preparation method thereof, which method is carried out by subjecting a NaY molecular sieve as the raw material to a rare earth exchange and a dispersing pre-exchange, then to an ultra-stabilization calcination treatment. The molecular sieve comprises 1 to 20% by weight of rare earth oxide, not more than 1.2% by weight of sodium oxide, has a crystallinity of 51 to 69%, and a lattice parameter of 2.451 nm to 2.469 nm. In contrast to the prior art, in the molecular sieve prepared by this method, rare earth ions are located in sodalite cages, which is demonstrated by the fact that no rare earth ion is lost during the reverse exchange process. Moreover, the molecular sieve prepared by such a method has a molecular particle size D(v,0.5) of not more than 3.0 μm and a D(v,0.9) of not more than 20 μm. Cracking catalysts using the molecular sieve as an active component is characterized by a high heavy-oil-conversion capacity and a high yield of valuable target products.

16 Claims, No Drawings

(56) References Cited

FOREIGN PATENT DOCUMENTS

| | | |
|---|---|---|
| CN | 101147875 A | 3/2008 |
| CN | 101190416 A | 6/2008 |
| CN | 101284243 A | 10/2008 |
| CN | 101285001 A | 10/2008 |
| CN | 100497175 C | 6/2009 |
| CN | 101537366 A | 9/2009 |
| CN | 101767027 A | 7/2010 |
| CN | 102029177 A | 4/2011 |
| CN | 102133542 A | 7/2011 |
| CN | 101210187 B | 9/2011 |
| JP | 59-168089 A | 9/1984 |
| WO | 0112546 A1 | 2/2001 |

OTHER PUBLICATIONS

Search Report received in related CN application No. 201110420931.3 dated Nov. 25, 2011 and English translation.

International Search Report received in related International application No. PCT/CN2012/000509 dated Sep. 27, 2012 and English translation.

International Search Report received in related International application No. PCT/CN2012/000506 dated Sep. 20, 2012 and English translation.

Search Report received in related CN application No. 201110419914.8 dated Nov. 23, 2011 and English translation.

Office Action issued for corresponding European Patent Application No. 12857338.3 dated Jun. 17, 2016.

\* cited by examiner

ULTRA-STABLE RARE EARTH Y-TYPE MOLECULAR SIEVE AND PREPARATION METHOD THEREFOR

FIELD OF TECHNOLOGY

The present invention relates to an ultra-stable rare earth type Y molecular sieve and preparation methods thereof, and more particularly, to an ultra-stable rare earth type Y molecular sieve with improved cracking activity and particle dispersibility and a preparation method thereof.

BACKGROUND ART

Catalytic cracking apparatuses are crucial means for crude oil refining, and the economic benefits of refineries depend on the overall product distribution of these apparatuses. Recently, because of the growing trend towards heavier crude oils, a higher heavy-oil-conversion capacity and higher selectivity for high-value products are demanded for FCC catalysts. As a major provider of the cracking activity of heavy oil cracking catalysts, the type Y molecular sieve with high cracking activity and high active stability has been the key technical subject of research in the field of catalysis.

Extensive investigations have been carried out in domestic and abroad research institutions in order to improve the cracking activity and activity stability of type Y molecular sieves. As a current modification method widely adopted in the industry, type Y molecular sieves are modified with rare earth via ion exchange, which, in combination of optimization of calcination conditions, allows as many rare earth ions as possible to migrate into sodalite cages so as to suppress dealumination of the molecular sieve framework and therefore to improve the structural stability and the activity stability of the molecular sieves. Currently, NaY molecular sieve modification methods generally fall into three categories: the first category involves subjecting NaY molecular sieves to ion exchange with a small amount of rare earth and/or ammonium ions, and to subsequent calcination, and then conducting a rare earth ion and/or ammonium treatment or a dealumination treatment to prepare a REUSY molecular sieve (U.S. Pat. No. 3,595,611, U.S. Pat. No. 4,218,307, CN87104086.7); the second category involves preparing a USY molecular sieve from a NaY molecular sieve first, and then carrying out rare earth exchange to prepare a REUSY (ZL200510114495.1, ZL200410029875.0); and the third category involves introducing a precipitating agent during the rare-earth modification of NaY molecular sieves to form a rare earth precipitate so as to improve the heavy metal-resistant ability, the cracking activity and the rare earth utilization during preparation of the molecular sieves (ZL02103909.7, ZL200410058089.3, ZL02155600.8). None of the type Y molecular sieve modification methods provided in the above patent documents specifies the precise localization of rare earth ions, and therefore the activity stability and the structural stability of the type Y molecular sieves prepared in the prior art cannot adapt to the growing trend towards crude oils having higher density and poorer quality.

US patents like U.S. Pat. No. 5,340,957 and U.S. Pat. No. 4,584,287 describe a method for modifying type Y molecular sieves, comprising steps of modifying the raw material, i.e. a NaY molecular sieve, via an exchange reaction with rare earth and/or Group VIII elements, and then subjecting it to a hydrothermal treatment to afford an ultra-stable rare earth type Y molecular sieve having high stability. Localization of the rare earth ions or grain distribution is not described with regard to the method.

Chinese patent ZL97122039.5 describes a preparation method of ultra-stable Y zeolites, comprising steps of putting a Y zeolite into contact with an acid solution and an ammonium-containing solution, and subjecting them to a high-temperature steam treatment, wherein the amount of the acid used is 1.5 to 6 moles of hydrogen ions per mole of framework aluminum, the concentration of the acid solution is 0.1 to 5 N, the Y zeolite is kept in contact with the acid solution at a temperature of 5 to 100° C. for a duration of 0.5 to 72 h, and the weight ratio between the Y zeolite and the ammonium ion is 2 to 20. The modification method in accordance with this patent requires addition of an ammonium-containing solution for the purpose of lowering the sodium oxide content in the molecular sieve or reducing the damage to the molecular sieve structure caused by acidic gases during calcination. However, this technique has the following technical disadvantages: 1) since a large number of ammonium ions are added in the preparation process, ammonium-containing ions eventually enter the atmosphere or waste water, increasing ammonia nitrogen pollution and the cost for pollution control; 2) the method of this patent is unable to solve the issue of particle agglomeration in molecular sieves, which issue reduces specific surface area and pore volume of the molecular sieve and increases the obstruction in the pore channel during exchange in the molecular sieve, making it difficult to accurately and quantitatively localize the modifying element in the cages of the molecular sieve; 3) moreover, in this patent it is further mentioned that rare earth ions may also be introduced by ion exchange, during or after the contact between the Y zeolite and the ammonium-containing solution, and that during the ion exchange, ammonium ions compete with rare earth ions and preferentially take up the positions intended for rare earth ions, thereby hindering rare earth ions from entering the cages of the molecular sieve by exchange, and also lowering the utilization of rare earth ions.

Chinese patent ZL02103909.7 describes a method for preparing rare earth-containing ultra-stable Y molecular sieves by subjecting a NaY molecular sieve to one exchange process and one calcination process, characterized in that the NaY molecular sieve is placed in an ammonium-containing solution and subjected to chemical dealumination at 25 to 100° C. for 0.5 to 5 h, wherein the chemical dealumination chelating agent contains oxalic acid and/or oxalate salts, a rare earth solution is then introduced under stirring to produce a rare earth precipitate that contains rare earth oxalate, and the precipitate is filtered and washed to give a filter cake, followed by a hydrothermal treatment to afford the molecular sieve product. Although the molecular sieve prepared by this method has certain resistance to vanadium contamination, it has relatively low activity stability and cracking activity, and is insufficient to meet the requirement set out by the growing trend towards crude oils having higher density and poorer quality. This issue is mainly attributed to the distribution of rare earth ions in the supercages and sodalite cages of the molecular sieve during modification. This method demonstrates that rare earth ions are present in the molecular sieve system in two forms, i.e., a part of the rare earth enters sodalite cages in an ionic form, while the other part is scattered over the surface of the molecular sieve as an independent phase of rare earth oxide (the precursor of which is rare earth oxalate and is converted into rare earth oxide after subsequent calcination). Such distribution reduces the stabilizing and supporting effect of rare earth ions on the molecular sieve structure. Further-more, this method also poses a remarkable problem of ammonium nitrogen pollution, and the oxalic acid or oxalate salts added are also toxic and detrimental to the environment and human.

Chinese patent 200510114495.1 describes a method for increasing the rare earth content in ultra-stable type Y zeolites. In this method, an ultra-stable type Y zeolite and an acidic solution at a concentration of 0.01 to 2 N are sufficiently mixed in a solid-to-liquid ratio of 4-20 at a temperature of 20 to 100° C., treated for 10 to 300 minutes, washed and filtered, then subjected to rare earth ion exchange upon addition of a rare earth salt solution, and then washed, filtered and dried after the exchange, to afford a rare earth ultra-stable type Y zeolite. In this invention, a type Y molecular sieve obtained from water-vapor ultra-stabilization calcination is used as the raw material and subjected to a second exchange and a second calcination for chemical modification, but no investigation on dispersibility of molecular sieve particles is involved.

CN200410029875.0 discloses a preparation method of a rare earth ultra-stable type Y zeolite, characterized in that, in this method, a NaY molecular sieve is subjected to ion exchange with an inorganic ammonium solution first, and then subjected to a water vapor ultra-stabilization treatment to obtain a "one-exchange one-calcination" product; the "one-exchange one calcination" product is then added into a mixed solution of a rare earth salt and citric acid or a mixed solution of an inorganic ammonium salt, a rare earth salt and citric acid, and subjected to an exchange reaction at a certain temperature; and, after completion of the reaction, the molecular sieve slurry is filtered, washed, and eventually calcinated at 450 to 750° C. in air or under a 100% water vapor atmosphere for 0.5 to 4 hours. In this technique, the rare earth modification involves a second exchange modification of the "one-exchange one-calcination" product that serves as the raw material. Because of the lattice contraction of the molecular sieve after the "one-exchange one-calcination", fragmental aluminum inside the pores clogs the pore channels, increasing the hindrance to rare earth ion exchange, which renders it difficult to accurately localize rare earth ions in sodalite cages.

None of the type Y molecular sieve modification methods provided in the above patent documents specifies the precise localization of rare earth ions, and therefore the activity stability and the structural stability of the type Y molecular sieves prepared in the prior art cannot adapt to the growing trend towards crude oils having higher density and poorer quality.

SUMMARY OF THE INVENTION

An objective of the present invention is to provide an ultra-stable rare earth type Y molecular sieve with high activity stability, and a preparation method thereof. The molecular sieve provided by said method has a low coke yield, a great capacity for heavy oil conversion, and strong resistance to heavy metals, while said method is characterized by a simple preparation process, high utilization of the modifying element(s), and a low level of ammonium nitrogen pollution.

The present invention provides an ultra-stable rare earth type Y molecular sieve, characterized in that the molecular sieve comprises 1 to 20% by weight of rare earth oxide, not more than 1.2% by weight of sodium oxide, a crystallinity of 51% to 69%, and a lattice parameter of 2.449 nm to 2.469 nm. The preparation process of the molecular sieve includes a rare-earth exchange and a dispersing pre-exchange, wherein the order of the rare earth exchange and the dispersing pre-exchange is not limited, and the rare earth exchange and the dispersing pre-exchange are consecutively conducted without a calcination process therebetween. The dispersing pre-exchange refers to a process of adjusting the molecular sieve slurry's concentration to a solid content of 80 to 400 g/L and adding 0.2 to 7% by weight of a dispersing agent to carry out dispersing pre-exchange at an exchange temperature of 0 to 100° C. for 0.1 to 1.5 h. The dispersing agent in the dispersing pre-exchange process is selected from one or more, preferably two or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch. No ammonium salt is used in the rare earth exchange or the dispersing pre-exchange.

The present invention further provides a more specific preparation method of the ultra-stable rare earth type Y molecular sieve, wherein the raw material, i.e. a NaY molecular sieve (preferably with a silica-to-alumina ratio greater than 4.0, and a crystallinity greater than 70%), is subjected to a rare earth exchange and a dispersing pre-exchange, then the molecular sieve slurry is filtered, washed, and subjected to a first calcination to afford a "one-exchange one-calcination" rare earth sodium Y molecular sieve, wherein the order of the rare earth exchange and the dispersing pre-exchange is not limited; and the "one-exchange one-calcination" rare earth sodium Y molecular sieve is then subjected to an ammonium salt exchange for sodium reduction and a second calcination, so as to obtain an REUSY molecular sieve product according to the present invention (also referred to as an ultra-stable rare earth type Y molecular sieve).

In the preparation method of the ultra-stable rare earth type Y molecular sieve provided in accordance with the present invention, between the rare earth exchange and the dispersing pre-exchange of the NaY molecular sieve, the molecular sieve slurry may or may not be washed and filtered. During the rare earth exchange, the $RE_2O_3$/Y zeolite (by mass) is preferably 0.005 to 0.25, most preferably 0.01 to 0.20; the exchange temperature is 0 to 100° C., preferably 60 to 95° C.; the exchange pH is 2.5 to 6.0, preferably 3.5 to 5.5; and the exchange time is 0.1 to 2 h, preferably 0.3 to 1.5 h. During the dispersing pre-exchange, the amount of the dispersing agent added is 0.2 to 7% by weight, preferably 0.2 to 5% by weight; the exchange temperature is 0 to 100° C., preferably 60 to 95° C.; and the exchange time is 0.1 to 1.5 h. The molecular sieve slurry after modification is filtered and washed to give a filter cake, which is then dried by flash evaporation to make the water content thereof between 30% and 50%, and eventually calcinated to afford the "one-exchange one-calcination" ultra-stable rare earth sodium Y molecular sieve, wherein general conditions may be used for the calcination, for example, a calcination at 350 to 700° C. under 0 to 100% water vapor for 0.3 to 3.5 h, preferably at 450 to 650° C. under 15 to 100% water vapor for 0.5 to 2.5 h. General conventional conditions may be employed as the conditions of the ammonium salt exchange and the second calcination of the "one-exchange one-calcination" ultra-stable rare earth sodium Y molecular sieve, and a recommended method is as follows: a "one-exchange one-calcination" ultra-stable rare earth sodium Y molecular sieve is added into deionized water, the solid content is adjusted to 100 to 400 g/L, wherein the $NH_4^+$/Y zeolite (by mass) is 0.02 to 0.40, preferably 0.02 to 0.30, and the pH is 2.5 to 5.0, preferably 3.0 to 4.5; after a reaction at 60 to 95° C. for 0.3 to 1.5 h, the molecular sieve slurry is filtered and washed, and the resultant filter cake is calcinated at 450 to 700° C. under 0 to 100% water vapor for 0.3 to 3.5 h, preferably 0.5 to 2.5 h, to finally obtain an ultra-stable rare earth type Y molecular sieve provided in accordance with the present invention. Tank-type exchange, belt-type exchange and/or filter cake exchange may be employed in the exchange process of the rare earth exchange and the dispersing pre-exchange. The rare earth exchange may be carried out in which the rare earth compound solution may be divided into several portions, provided that the total amount of rare earth is not changed, to undergo tank-type exchange, belt-type exchange and/or filter cake exchange, i.e., multiple exchanges. Similarly, in the dispersing pre-exchange, the dispersing agent may be divided into several portions, provided that the total amount of the dispersing agent is not changed, to undergo tank-type exchange, belt-type exchange and/or filter cake exchange. When the rare earth exchange and the dispersing pre-exchange are multiple exchanges, these two types of exchange may be carried out alternately.

In the preparation of the molecular sieves according to the present invention, the preparation method of the "one-exchange one-calcination" ultra-stable rare earth sodium Y molecular sieve may be as follows: a NaY molecular sieve is subjected to a rare earth exchange first, followed by filtration and washing after completion of the reaction; the filter cake is then thoroughly mixed with a dispersing agent to carry out a pre-exchange reaction; and finally the filter cake is dried by flash evaporation and then calcinated.

In the preparation of the molecular sieves according to the present invention, the preparation method of the "one-exchange one-calcination" ultra-stable rare earth sodium Y molecular sieve may also be as follows: a NaY molecular sieve is subjected to a dispersing pre-exchange first, and after completion of the reaction, filtration and washing are carried out to produce a filter cake; the filter cake is then thoroughly mixed with a rare earth compound solution to carry out a filter cake exchange, and after completion of the reaction, the filter cake is dried by flash evaporation and then calcinated.

In the preparation of the molecular sieves according to the present invention, the preparation method of the "one-exchange one-calcination" ultra-stable rare earth sodium Y molecular sieve may alternatively be as follows: a NaY molecular sieve is subjected to a dispersing pre-exchange first, and then to a tank-type exchange upon addition of rare earth compounds, followed by filtration, washing and calcination after completion of the reaction.

In the preparation of the molecular sieves according to the present invention, the preparation method of the "one-exchange one-calcination" ultra-stable rare earth sodium Y molecular sieve may also be as follows: a NaY molecular sieve is subjected to a rare earth exchange first; and after completion of the reaction, a dispersing agent is added to carry out dispersing pre-exchange, which is followed by filtration, washing, and calcination.

In the preparation of the molecular sieves according to the present invention, the preparation method of the "one-exchange one-calcination" ultra-stable rare earth sodium Y molecular sieve may alternatively be as follows: a NaY molecular sieve is subjected to a dispersing pre-exchange first; after completion of the reaction, the molecular sieve slurry is subjected to filtration and a rare-earth belt-type exchange in a belt-type filter, followed by washing of the filter cake; and the filter cake after filtration and washing is eventually calcinated; wherein the condition for the rare earth belt-type exchange in the belt-type filter is: an exchange temperature of 60 to 95° C., an exchange pH of 3.2 to 4.8, and a vacuum degree of 0.03 to 0.05 in the belt-type filter.

In the preparation of the molecular sieves according to the present invention, the preparation method of the "one-exchange one-calcination" ultra-stable rare earth sodium Y molecular sieve may also be as follows: a NaY molecular sieve is subjected to a rare earth exchange first; after completion of the reaction, the molecular sieve slurry is subjected to filtration and a belt-type dispersing pre-exchange in a belt-type filter, followed by washing of the filter cake; and the filter cake after filtration and washing is eventually calcinated; wherein the condition for the belt-type dispersing pre-exchange in the belt-type filter is: an addition amount of 0.2% to 7% by weight, an exchange temperature of 0 to 100° C., an exchange duration of 0.1 to 1.5 h, and a vacuum degree of 0.03 to 0.05 in the belt-type filter.

The preparation method of the "one-exchange one-calcination" ultra-stable rare earth sodium Y molecular sieve according to the present invention may also be as follows: after completion of a dispersing pre-exchange of a NaY molecular sieve, a rare earth exchange may be carried out wherein the rare earth compound solution may be divided into several portions, provided that the total amount of rare earth is not changed, to undergo tank-type exchange, belt-type exchange and/or filter cake exchange.

The preparation method of the "one-exchange one-calcination" ultra-stable rare earth sodium Y molecular sieve according to the present invention may also be as follows: the dispersing pre-exchange of the NaY molecular sieve may be carried out wherein the dispersing agent may be divided into several portions, provided that the total amount of the dispersing agent is not changed, to undergo tank-type exchange, belt-type exchange and/or filter cake exchange.

The preparation method of the "one-exchange one-calcination" ultra-stable rare earth sodium Y molecular sieve according to the present invention may also be as follows: a NaY molecular sieve is subjected to a dispersing pre-exchange reaction with a selected dispersing agent first, and then to a rare earth exchange reaction; after completion of the reaction, another dispersing agent is further added to carry out a second dispersing pre-exchange, wherein the molecular sieve may or may not be filtered between the two dispersing pre-exchange reactions.

The effect of the present invention will not be affected by different orders of reaction steps in the present invention.

The rare earth compound according to the present invention is rare earth chloride, rare earth nitrate or rare earth sulfate, and preferably rare earth chloride or rare earth nitrate.

The rare earth according to the present invention may be lanthanum-rich or cerium-rich rare earth, or may be pure lanthanum or pure cerium rare earth.

DETAILED DESCRIPTION OF PREFERRED EMBODIMENT

Further, examples are given hereinafter to further illustrate the present invention. However, the invention is not limited to these examples.

(I) Methods for Analysis and Evaluation Used in the Examples
1. Lattice parameter ($a_0$): X-ray diffraction.
2. Crystallinity (C/Co): X-ray diffraction.
3. Silica-to-alumina ratio: X-ray diffraction.

4. Na$_2$O content: flame photometry.
5. RE$_2$O$_3$ content: colorimetry.
6. Particle size: the instrument used was a MICRO-PLUS laser particle size analyzer, complete Mie theory was applied to the full range, and the test range was 0.05 to 550 μm.

(II) Specification of Raw Materials Used in Examples

1. NaY molecular sieves: NaY-1 (the silica/alumina ratio: 4.8, crystallinity: 92%), NaY-2 (the silica/alumina ratio: 4.1, crystallinity: 83%), manufactured by Lanzhou Petrochemical Corporation, Catalyst Division.
2. Ultra-stable "one-exchange one-calcination" molecular sieve samples: crystallinity being 60%, sodium oxide being 4.3 m %, manufactured by Lanzhou Petrochemical Corporation, Catalyst Division.
3. Rare earth solutions: rare earth chloride (rare earth oxide: 277.5 g/L), rare earth nitrate (rare earth oxide: 252 g/L), both of which are industrial grade and purchased from Lanzhou Petrochemical Corporation, Catalyst Division.
4. Sesbania gum powder, boric acid, urea, ethanol, polyacrylamide, oxalic acid, adipic acid, acetic acid, formic acid, hydrochloric acid, nitric acid, citric acid, salicylic acid, tartaric acid, and starch, all of which are chemically pure; ammonium chloride, ammonium nitrate, ammonium sulfate, and ammonium oxalate, all of which are industrial grade.

(III) Evaluation of Reactions

ACE heavy oil microreactor: the reaction temperature was 530° C., the catalyst/oil ratio was 5, and the raw oil was Xinjiang oil blended with 30% vacuum residual oil.

Example 1

To a reaction kettle equipped with a heating mantle, 3000 g NaY-1 molecular sieve (dry basis) and a certain amount of deionized water were consecutively added and blended into a slurry having a solid content of 220 g/L, and 82 g boric acid and 105 g sesbania gum powder were added thereto. The temperature was raised to 85° C., an exchange reaction was carried out for 0.5 h under stirring, followed by filtration and washing, the resultant filter cake was placed in a reaction kettle, and then 1.67 L rare earth chloride was added. The system pH was adjusted to 4.0, the temperature was elevated to 80° C., and an exchange reaction was carried out for 0.3 h. The resultant filter cake was dried by flash evaporation such that the moisture content thereof was 30% to 50%, and was finally calcinated under 70% water vapor at 670° C. for 1.0 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and a certain amount of deionized water were added to prepare a slurry having a solid content of 120 g/L, to which 120 g ammonium sulfate was added. The system pH was adjusted to 4.2, the temperature was raised to 90° C., and an exchange reaction was carried out for 0.8 h, followed by filtration and washing. The filter cake was calcinated under 80% water vapor at 560° C. for 2.5 h, so as to produce the active component of a rare earth ultra-stable Y molecular sieve according to the present invention, designated as Modified Molecular Sieve A-1.

Example 2

To a reaction kettle equipped with a heating mantle, 3000 g NaY-1 molecular sieve (dry basis) and a certain amount of deionized water were consecutively added and blended into a slurry having a solid content of 360 g/L, and 0.82 L rare earth nitrate was added thereto. The system pH was adjusted to 3.3, the temperature was raised to 80° C., and an exchange reaction was carried out for 1.5 h, followed by filtration and washing. The resultant filter cake was placed in a reaction kettle, to which 202 g polyacrylamide and 30 g salicylic acid were then added. The temperature was then elevated to 78° C. for dispersing exchange, and the exchange reaction was carried out for 0.5 h under stirring. The resultant filter cake was dried by flash evaporation such that the moisture content thereof was 30% to 50%, and was finally calcinated under 30% water vapor at 630° C. for 1.8 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 370 g/L, to which 200 g ammonium sulfate was added. The system pH was adjusted to 3.6, the temperature was raised to 90° C., and an exchange reaction was carried out for 1.2 h, followed by filtration and washing. The filter cake was calcinated under 20% water vapor at 600° C. for 0.5 h, so as to produce the active component of a rare earth ultra-stable Y molecular sieve according to the present invention, designated as Modified Molecular Sieve A-2.

Comparative Example 1

This comparative example demonstrates the performance feature of an REUSY prepared without addition of polyacrylamide and salicylic acid during the molecular sieve modification.

An REUSY molecular sieve was prepared according to the method described in Example 2, with the only exception that no polyacrylamide and salicylic acid were added. The resultant ultra-stable rare earth type Y molecular sieve is designated as DB-1.

Example 3

To a reaction kettle equipped with a heating mantle, 3000 g NaY-1 molecular sieve (dry basis) and deionized water were consecutively added and blended into a slurry having a solid content of 100 g/L, and 180 g citric acid was then added thereto for dispersing pre-exchange. The temperature was raised to 85° C., and the exchange reaction was carried out for 0.5 h. Then 1.08 L rare earth chloride was added thereto. The system pH was adjusted to 4.5, the temperature was raised to 85° C., and an exchange reaction was carried out for 1 h, followed by filtration and washing. The resultant filter cake was dried by flash evaporation such that the moisture content thereof was 30% to 50%, and was finally calcinated under 40% water vapor at 540° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated under 50% water vapor at 650° C. for 2 h, so as to produce the active component of a rare earth ultra-stable Y molecular sieve according to the present invention, designated as Modified Molecular Sieve A-3.

Example 4

To a reaction kettle equipped with a heating mantle, 3000 g NaY-1 molecular sieve (dry basis) and deionized water were consecutively added and blended into a slurry having a solid content of 200 g/L, and 32 g HCl was added thereto. The temperature was raised to 85° C., and an exchange reaction was carried out for 0.5 h. Then, 0.22 L rare earth chloride was added. The system pH was adjusted to 4.8, the temperature was raised to 70° C., and an exchange reaction was carried out for 1 h. Subsequently, 48 g urea was added for dispersing exchange, the temperature was raised to 85° C., and the exchange reaction was carried out for 0.8 h under stirring, followed by filtration and washing. The resultant filter cake was placed in a reaction kettle, to which 1.43 L rare earth chloride were then added. The temperature was then elevated to 78° C., and an exchange reaction was carried out for 0.5 h. Then the resultant filter cake was dried by flash evaporation such that the moisture content thereof was 30% to 50%, and was finally calcinated under 40% water vapor at 540° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated under 50% water vapor at 650° C. for 2 h, so as to produce the active component of a rare earth ultra-stable Y molecular sieve according to the present invention, designated as Modified Molecular Sieve A-4.

Example 5

To a reaction kettle equipped with a heating mantle, 3000 g NaY-1 molecular sieve (dry basis) and deionized water were consecutively added and blended into a slurry having a solid content of 250 g/L, to which 132 g urea was added. The temperature was raised to 60° C., and an exchange reaction was carried out for 0.8 h under stirring. Then, 0.76 L rare earth chloride was added. The system pH was adjusted to 4.2, the temperature was raised to 85° C., and an exchange reaction was carried out for 1.5 h, followed by filtration and washing. The resultant filter cake was placed in a reaction kettle, to which 39 g adipic acid was then added. The temperature was then elevated to 78° C. for dispersing exchange, and the exchange reaction was carried out for 0.5 h under stirring. After completion of the reaction, filtration and washing were carried out, and the resultant filter cake was dried by flash evaporation such that the moisture content thereof was 30% to 50%, and was finally calcinated under 80% water vapor at 560° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 180 g/L, to which 100 g ammonium sulfate was added. The system pH was adjusted to 4.0, the temperature was raised to 90° C., and an exchange reaction was carried out for 1 h, followed by filtration and washing. The filter cake was calcinated under 100% water vapor at 620° C. for 2 h, so as to produce the active component of a rare earth ultra-stable Y molecular sieve according to the present invention, designated as Modified Molecular Sieve A-5.

Example 6

To a reaction kettle equipped with a heating mantle, 3000 g NaY-1 molecular sieve (dry basis) and deionized water were consecutively added and blended into a slurry having a solid content of 90 g/L, and 59 g HCl was added thereto. The temperature was raised to 90° C., and an exchange reaction was carried out for 1 h under stirring. Then, 0.54 L rare earth nitrate was added. The system pH was adjusted to 3.7, the temperature was raised to 80° C., and an exchange reaction was carried out for 0.5 h. After the reaction was completed, 67 g ethanol was added, and a reaction was carried out at 76° C. for 0.6 h, followed by filtration and washing. The resultant filter cake was dried by flash evaporation such that the moisture content thereof was 30% to 50%, and was finally calcinated under 70% water vapor at 450° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 300 g/L, to which 175 g ammonium sulfate was added. The system pH was adjusted to 4.3, the temperature was raised to 90° C., and an exchange reaction was carried out for 0.6 h, followed by filtration and washing. The filter cake was calcinated under 70% water vapor at 650° C. for 1.5 h, so as to produce the active component of a rare earth ultra-stable Y molecular sieve according to the present invention, designated as Modified Molecular Sieve A-6.

Example 7

To a reaction kettle equipped with a heating mantle, 3000 g NaY-1 molecular sieve (dry basis) and a certain amount of deionized water were consecutively added and blended into a slurry having a solid content of 180 g/L, and 1.46 L rare earth nitrate was added thereto. The system pH was adjusted to 3.5, the temperature was raised to 85° C., and an exchange reaction was carried out for 1.2 h. Then, 108 g ethanol was added. The temperature was raised to 90° C., and an exchange reaction was carried out for 1 h under stirring, followed by filtration and washing. The resultant filter cake was dried by flash evaporation such that the moisture content thereof was 30% to 50%, and was finally calcinated under 50% water vapor at 520° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 250 g/L, to which 150 g ammonium sulfate was added. The system pH was adjusted to 4.0, the temperature was raised to 90° C., and an exchange reaction was carried out for 1 h, followed by filtration and washing. The filter cake was calcinated under 100% water vapor at 650° C. for 2 h, so as to produce the active component of a rare earth ultra-stable Y molecular sieve according to the present invention, designated as Modified Molecular Sieve A-7.

Example 8

To a reaction kettle equipped with a heating mantle, 3000 g NaY-1 molecular sieve (dry basis) and deionized water were consecutively added and blended into a slurry having a solid content of 150 g/L, to which 43 g HCl was added, and a reaction was carried out at 85° C. for 1 h. Then, 1.68 L rare earth chloride was added. The system pH was adjusted to 3.7, the temperature was raised to 90° C., and an exchange reaction was carried out for 1 h. The molecular sieve slurry was then filtered and subjected to a belt-type exchange with a dispersing agent. The conditions for the belt-type exchange were as follows: 35 g oxalic acid was formulated into a solution of pH 3.4, the temperature was raised to 85° C., and the vacuum degree in the belt-type filter was 0.04. The resultant filter cake was dried by flash evaporation such that the moisture content thereof was 30% to 50%, and was finally calcinated under 10% water vapor at 510° C. for 2.0 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated under 50% water vapor at 650° C. for 2 h, so as to produce the active component of a rare earth ultra-stable Y molecular sieve according to the present invention, designated as Modified Molecular Sieve A-8.

Comparative Example 2

This comparative example demonstrates the performance feature of an REUSY prepared without adding HCl and oxalic acid during the molecular sieve modification.

An REUSY molecular sieve was prepared according to the method described in Example 8, with the only exception that no HCl and oxalic acid were added. The resultant ultra-stable rare earth type Y molecular sieve is designated as DB-2.

Example 9

To a reaction kettle equipped with a heating mantle, 3000 g NaY-1 molecular sieve (dry basis) and a certain amount of deionized water were consecutively added and blended into a slurry having a solid content of 180 g/L, and 167 g tartaric acid was added thereto. Then the temperature was raised to 85° C., and an exchange reaction was carried out for 0.5 h under stirring. Thereafter, 32 g ethanol was added, and a reaction was carried out at 85° C. for 0.5 h, followed by filtration and washing. The resultant filter cake was placed into a reaction kettle, to which 1.31 L rare earth nitrate was added. The system pH was adjusted to 3.8, the temperature was raised to 80° C., and an exchange reaction was carried out for 1 h. The resultant filter cake was eventually dried by flash evaporation such that the moisture content thereof was 30% to 50%, and was calcinated under 100% water vapor at 480° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 220 g/L, to which 80 g ammonium sulfate was added. The system pH was adjusted to 4.5, the temperature was raised to 90° C., and an exchange reaction was carried out for 0.5 h, followed by filtration and washing. The filter cake was calcinated under 100% water vapor at 580° C. for 1.8 h, so as to produce the active component of a rare earth ultra-stable Y molecular sieve according to the present invention, designated as Modified Molecular Sieve A-9.

Example 10

To a reaction kettle equipped with a heating mantle, 3000 g NaY-1 molecular sieve (dry basis) and a certain amount of deionized water were consecutively added and blended into a slurry having a solid content of 320 g/L, to which 30 g nitric acid was added. Then the temperature was raised to 85° C., and an exchange reaction was carried out for 0.8 h under stirring. Thereafter, 0.95 L rare earth nitrate was added. The system pH was adjusted to 3.3, the temperature was raised to 80° C., and an exchange reaction was carried out for 1.8 h. Then 62 g starch was added, and a reaction was carried out at 80° C. for 0.5 h, followed by filtration and washing after completion of the reaction. The resultant filter cake was dried by flash evaporation such that the moisture content thereof was 30% to 50%, and was finally calcinated under 60% water vapor at 560° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 280 g/L, to which 130 g ammonium sulfate was added. The system pH was adjusted to 4.0, the temperature was raised to 90° C., and an exchange reaction was carried out for 0.5 h, followed by filtration and washing. The filter cake was calcinated under 60% water vapor at 680° C. for 1 h, so as to produce the active component of a rare earth ultra-stable Y molecular sieve according to the present invention, designated as Modified Molecular Sieve A-10.

Example 11

To a reaction kettle equipped with a heating mantle, 3000 g NaY-1 molecular sieve (dry basis) and a certain amount of deionized water were consecutively added and blended into a slurry having a solid content of 160 g/L, and 1.40 L rare earth nitrate was added thereto. The system pH was adjusted to 3.7, the temperature was raised to 90° C., and a reaction was carried out for 0.8 h. Thereafter, 48 g citric acid was added thereto. The temperature was raised to 85° C., and an exchange reaction was carried out for 0.5 h under stirring, followed by filtration and washing. To the resultant filter cake, 39 g acetic acid and 76 g urea were added, the temperature was then raised to 95° C., and a reaction was carried out for 0.5 h under stirring. The resultant filter cake was dried by flash evaporation such that the moisture content thereof was 30% to 50%, and was eventually calcinated under 80% water vapor at 580° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 50 g ammonium sulfate was added. The system pH was adjusted to 3.8, the temperature was raised to 90° C., and an exchange reaction was carried out for 1 h, followed by filtration and washing. The filter cake was calcinated under 100% water vapor at 610° C. for 2 h, so as to produce the active component of a rare earth ultra-stable Y molecular sieve according to the present invention, designated as Modified Molecular Sieve A-11.

Example 12

To a reaction kettle equipped with a heating mantle, 3000 g NaY-1 molecular sieve (dry basis) and a certain amount of deionized water were consecutively added and blended into a slurry having a solid content of 180 g/L, to which 32 g formic acid and 68 g ethanol were added. Then the temperature was raised to 85° C., and an exchange reaction was carried out for 1.5 h under stirring. Thereafter, 0.82 L rare earth nitrate was added. The system pH was adjusted to 3.3, the temperature was raised to 90° C., and an exchange reaction was carried out for 1 h. After the reaction was completed, 48 g formic acid and 30 g ethanol were added, and a reaction was carried out at 85° C. for 0.8 h, followed by filtration and washing. The resultant filter cake was dried by flash evaporation such that the moisture content thereof was 30% to 50%, and was finally calcinated under 10% water vapor at 560° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 50 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h, so as to produce the active component of a rare earth ultra-stable Y molecular sieve according to the present invention, designated as Modified Molecular Sieve A-12.

Example 13

To a reaction kettle equipped with a heating mantle, 3000 g NaY-1 molecular sieve (dry basis) and a certain amount of deionized water were consecutively added and blended into a slurry having a solid content of 350 g/L, and 42 g citric acid and 28 g sesbania gum powder were added thereto. The temperature was then raised to 82° C., and an exchange reaction was carried out for 1.3 h under stirring. After the reaction was completed, 0.56 L rare earth nitrate was added, and an exchange reaction was carried out at 85° C. for 0.8 h. The molecular sieve slurry was then filtered and subjected to a belt-type exchange. The conditions for the belt-type exchange were as follows: the temperature of the rare earth nitrate solution was raised to 88° C., the exchange pH was 4.7, the amount of rare earth nitrate added, in terms of $RE_2O_3/Y$ zeolite (by mass), was 0.04, and the vacuum degree in the belt-type filter was 0.03. Thereafter, the resultant filter cake was dried by flash evaporation such that the moisture content thereof was 30% to 50%, and was finally calcinated under 80% water vapor at 530° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h, so as to produce the active component of a rare earth ultra-stable Y molecular sieve according to the present invention, designated as Modified Molecular Sieve A-13.

Example 14

To a reaction kettle equipped with a heating mantle, 3000 g NaY-1 molecular sieve (dry basis) and a certain amount of deionized water were consecutively added and blended into a slurry having a solid content of 190 g/L, and 78 g urea and 46 g HCl were added to adjust the system pH to 6.5. The temperature was then raised to 90° C., and an exchange reaction was carried out for 0.6 h under stirring. The molecular sieve slurry was then filtered and subjected to a belt-type exchange. The conditions for the belt-type exchange were as follows: the temperature of the rare earth nitrate solution was raised to 88° C., the exchange pH was 4.2, the amount of rare earth nitrate added in terms of $RE_2O_3/Y$ zeolite (by mass) was 0.12, and the vacuum degree in the belt-type filter was 0.05. Thereafter, the resultant filter cake was dried by flash evaporation such that the moisture content thereof was 30% to 50%, and was finally calcinated under 100% water vapor at 580° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h, so as to produce the active component of a rare earth ultra-stable Y molecular sieve according to the present invention, designated as Modified Molecular Sieve A-14.

Comparative Example 3

This comparative example demonstrates the performance feature of an REUSY prepared during the molecular sieve modification where only HCl was added.

An REUSY molecular sieve was prepared according to the method described in Example 14, with the only exception that no HCl was added. The resultant ultra-stable rare earth type Y molecular sieve is designated as DB-3.

Example 15

To a reaction kettle equipped with a heating mantle, 3000 g NaY-1 molecular sieve (dry basis) and a certain amount of deionized water were consecutively added and blended into a slurry having a solid content of 110 g/L, and 42 g sesbania gum powder and 28 g salicylic acid were added thereto. The temperature was then raised to 89° C., and an exchange reaction was carried out for 1 h under stirring. Afterward, 0.48 L rare earth nitrate was added. The system pH was adjusted to 3.7, the temperature was raised to 83° C., and an exchange reaction was carried out for 1 h. The molecular sieve slurry was then filtered and washed, the resultant filter cake was placed into an exchange tank and mashed, and 1.19 L rare earth nitrate ($RE_2O_3/Y$ zeolite was 0.10) was added thereto. The system pH was adjusted to 4.1, the temperature was raised to 78° C., and an exchange reaction was carried out for 0.7 h. Thereafter, the resultant filter cake was dried by flash evaporation such that the moisture content thereof was 30% to 50%, and was finally calcinated under 100% water vapor at 630° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h, so as to produce the active component of a rare earth ultra-stable Y molecular sieve according to the present invention, designated as Modified Molecular Sieve A-15.

Example 16

To a reaction kettle equipped with a heating mantle, 3000 g NaY-1 molecular sieve (dry basis) and a certain amount of deionized water were consecutively added and blended into a slurry having a solid content of 170 g/L, and 0.18 L rare earth nitrate was added thereto. The system pH was adjusted to 4.1, the temperature was then raised to 80° C., and an exchange reaction was carried out for 1.2 h. The molecular sieve slurry was then filtered and subjected to a belt-type exchange with a dispersing agent. The conditions for the belt-type exchange were as follows: 52 g acetic acid and 146 g citric acid were formulated into a 80 g/L solution, the temperature was raised to 85° C., and the vacuum degree in the belt-type filter was 0.04. Thereafter, the resultant filter cake was dried by flash evaporation such that the moisture content thereof was 30% to 50%, and was finally calcinated under 100% water vapor at 500° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h, so as to produce the active component of a rare earth ultra-stable Y molecular sieve according to the present invention, designated as Modified Molecular Sieve A-16.

Comparative Example 4

In this comparative example, the molecular sieve preparation method described in Example 1 of CN200410058089.3 was used, while the other conditions were the same as those in present Example 15.

To a reaction kettle equipped with a heating mantle, deionized water and 3000 g NaY-1 molecular sieve (dry basis) were consecutively added and blended into a slurry having a solid content of 150 g/L, to which 450 g ammonium sulfate was then added. After stirring at 90° C. for 5 minutes, the system pH was adjusted to 3.8 with HCl, and stirring was continued for 1 hour before filtration. The filter cake was added into 2 kg deionized water, and 1.67 L rare earth nitrate solution was added thereto, followed by stirring at 90° C. for 2 hours. 322 g sodium metaaluminate and 258 g aqueous ammonia were added thereto, and then stirred for 10 minutes, followed by filtration and washing. After drying in an air stream, it was transferred into a calcination furnace, calcinated under water vapor at a weight hourly space velocity of 0.5 h$^{-1}$ at 600° C. for 1.5 hours, and then cooled to afford DB-3A. It was then washed for 15 minutes with ammonium chloride at 90° C. in a molecular sieve:ammonium chloride:water ratio of 1:0.1:10, followed by drying, so as to produce a molecular sieve product, designated as DB-4.

Comparative Example 5

In this comparative example, the molecular sieve preparation method described in CN200510114495.1 was used, while the other conditions were the same as those in Example 16.

3000 g (dry basis) of an ultra-stable "one-exchange one-calcination" molecular sieve sample, manufactured hydrothermally by Lanzhou Petrochemical Corporation, Catalyst Division, was weighed and added into 3 L of a 2N oxalic acid solution and mixed thoroughly under stirring. The temperature was raised to 90 to 100° C., and a reaction was carried out for 1 hour, followed by filtration and washing. The resultant filter cake was put into 6 L deionized water, to which 1.46 L rare earth nitrate solution was added. The temperature was raised to 90 to 95° C., and a reaction was carried out for 1 hour, followed by filtration and washing. The filter cake was oven dried at 120° C., to produce a molecular sieve sample of this comparative example, designated as DB-5.

Comparative Example 6

In this comparative example, the molecular sieve preparation method described in CN97122039.5 was used, while the other conditions were the same as those in Example 4.

To a reaction kettle equipped with a heating mantle, 3000 g (dry basis) NaY-1 molecular sieve and deionized water were added and blended into a slurry having a solid content of 90 g/L. The temperature was raised to 80° C. under stirring, 59 g HCl was added thereto, and the temperature was maintained for 8 hours. Then 1.65 L rare earth chloride solution and 1200 g solid ammonium chloride were added. After stirring for 1 h, it was filtered and washed until no chloride ion was detected. The resultant wet filter cake (with a moisture content of 47%) was calcinated at 600° C. for 2 hours, to produce a molecular sieve sample of this comparative example, designated as DB-6.

INDUSTRIAL APPLICABILITY

The physical and chemical properties of the ultra-stable rare earth type Y molecular sieves prepared in the Examples and Comparative Examples in connection with the present invention are listed in Table 1.

TABLE 1

Physical and chemical properties of molecular sieves

| Molecular Sieve No. | Rare Earth Oxide m % | Sodium Oxide m % | Lattice Parameter nm | Relative Crystallinity % | Particle size Distribution, μm | |
|---|---|---|---|---|---|---|
| | | | | | D(v, 0.5) | D(v, 0.9) |
| A-1 | 15.45 | 1.1 | 2.468 | 51 | 2.86 | 14.59 |
| A-2 | 6.89 | 0.94 | 2.462 | 59 | 2.75 | 13.67 |
| A-3 | 10.0 | 0.91 | 2.463 | 56 | 2.86 | 13.95 |
| A-4 | 15.26 | 0.97 | 2.468 | 52 | 2.68 | 14.57 |
| A-5 | 7.03 | 1.05 | 2.459 | 57 | 2.93 | 15.78 |
| A-6 | 4.54 | 0.98 | 2.454 | 63 | 2.68 | 12.96 |
| A-7 | 12.26 | 1.06 | 2.463 | 55 | 2.94 | 18.69 |
| A-8 | 15.54 | 0.92 | 2.469 | 51 | 2.92 | 17.26 |
| A-9 | 11.0 | 0.97 | 2.465 | 54 | 2.78 | 16.81 |
| A-10 | 7.98 | 1.05 | 2.461 | 57 | 2.92 | 15.92 |
| A-11 | 11.76 | 1.06 | 2.463 | 56 | 2.96 | 18.46 |
| A-12 | 6.89 | 1.04 | 2.459 | 60 | 2.73 | 17.53 |
| A-13 | 8.70 | 0.86 | 2.461 | 55 | 2.65 | 13.67 |
| A-14 | 12.0 | 0.93 | 2.463 | 57 | 2.98 | 15.88 |
| A-15 | 14.03 | 1.02 | 2.464 | 52 | 2.68 | 16.48 |
| A-16 | 1.51 | 1.16 | 2.449 | 69 | 2.90 | 14.53 |
| DB-1 | 6.78 | 1.1 | 2.464 | 52 | 4.23 | 33.58 |
| DB-2 | 15.46 | 1.02 | 2.469 | 47 | 4.52 | 36.83 |

TABLE 1-continued

Physical and chemical properties of molecular sieves

| Molecular Sieve No. | Rare Earth Oxide m % | Sodium Oxide m % | Lattice Parameter nm | Relative Crystallinity % | Particle size Distribution, μm | |
|---|---|---|---|---|---|---|
| | | | | | D(v, 0.5) | D(v, 0.9) |
| DB-3 | 12.04 | 1.68 | 24.68 | 48 | 4.76 | 40.05 |
| DB-4 | 13.89 | 1.74 | 24.69 | 45 | 4.68 | 39.47 |
| DB-5 | 8.27 | 1.60 | 24.67 | 54 | 4.83 | 37.42 |
| DB-6 | 12.86 | 1.82 | 24.68 | 49 | 4.85 | 41.48 |

The ultra-stable rare earth type Y molecular sieves provided in accordance with the present invention are characterized in that the molecular sieve comprises 1 to 20% by weight of rare earth oxide, and not more than 1.2% by weight of sodium oxide, and has a crystallinity of 51% to 69%, a lattice parameter of 2.449 nm to 2.469 nm, and a molecular sieve particle size D(v,0.5) of not more than 3.0 μm and D(v,0.9) of not more than 20 μm.

As can be seen from the data in the above table, 1) the molecular sieves prepared in accordance with the present invention have a sodium oxide content of not more than 1.2 m %, a rare earth oxide content of 1 to 20 m %, a lattice parameter of 2.449 nm to 2.469 nm, and a relative crystallinity of 51% to 69%; 2) as compared to the comparative molecular sieves, the molecular sieves prepared in accordance with the present invention have a substantially narrower particle size distribution, with the molecular sieve particle size D(v,0.5) being not more than 3.0 μm and the molecular sieve particle size D(v,0.9) being not more than 20 μm, indicating that the molecular sieve preparation method provided in accordance with the present invention can greatly improve the dispersibility of molecular sieve particles and reduce the degree of particle agglomeration; 3) when an ultra-stable type Y molecular sieve is used as the raw material for molecular sieve modification, a part of fragmental aluminum is present inside the channels due to the lattice contraction after the ultra-stabilization of the molecular sieve, thereby increasing the hindrance to rare earth exchange, and resulting in low utilization of rare earth in Comparative Example 5; 4) the molecular sieve prepared according to Comparative Example 6 has a low utilization of rare earth, because when ammonium is mixed with rare earth for exchange, rare earth ions complete with ammonium ions, which affects the precise localization of rare earth ions.

The molecular sieve products of Examples 1 to 16 and Comparative Examples 1 to 6 each were subjected to three ammonium exchanges under the conditions describe below, in order to investigate the change in rare earth contents in the molecular sieves and in the filtrate, so as to confirm whether rare earth ions were located in sodalite cages. The analysis results are shown in Table 2.

Exchange conditions: to a reaction kettle equipped with a heating mantle, 100 g molecular sieve and 0.6 L deionized water were added, and 40 g ammonium salt was added under stirring; the temperature was raised to 85° C., and an exchange reaction was carried out for 1 hour, followed by filtration and by washing with a 0.4 L chemical grade water; the filtrate and the filter cake were collected for rare earth content analysis.

TABLE 2

Analysis of rare earth content

| | Rare Earth Oxide | |
|---|---|---|
| Molecular Sieve No. | In Molecular Sieve, m % | In Filtrate, g/L |
| A-1 | 15.68 | Not detected |
| A-2 | 6.92 | Not detected |
| A-3 | 10.42 | Trace amount |
| A-4 | 15.53 | Not detected |
| A-5 | 7.42 | Not detected |
| A-6 | 4.68 | Not detected |
| A-7 | 12.36 | Trace amount |
| A-8 | 15.54 | Not detected |
| A-9 | 11.35 | Not detected |
| A-10 | 8.12 | Not detected |
| A-11 | 11.86 | Not detected |
| A-12 | 7.02 | Not detected |
| A-13 | 8.96 | Not detected |
| A-14 | 12.35 | Not detected |
| A-15 | 14.50 | Not detected |
| A-16 | 1.86 | Not detected |
| DB-1 | 6.26 | 0.51 |
| DB-2 | 15.06 | 0.35 |
| DB-3 | 11.35 | 0.68 |
| DB-4 | 12.82 | 0.82 |
| DB-5 | 7.67 | 0.43 |
| DB-6 | 12.35 | 0.57 |

As can be seen from the analysis results in Table 2, as compared with the comparative examples, the molecular sieves prepared by the type Y molecular sieve modification methods provided in accordance with the present invention have nearly no rare earth ions in the filtrate after three repeated ammonium exchanges. These results show that rare earth ions are all located in sodalite cages in the molecular sieves.

Table 3 shows analysis results about the stability of the ultra-stable rare earth type Y molecular sieves obtained in Examples 1 to 16 and Comparative Examples 1 to 6.

TABLE 3

Analysis results about the activity stability of molecular sieves

| Molecular Sieve No. | Retaining of Relative Crystallinity % | Collapse Temp. ° C. |
|---|---|---|
| A-1 | 68.2 | 1019 |
| A-2 | 72.1 | 1022 |
| A-3 | 73.5 | 1035 |
| A-4 | 69.6 | 1018 |
| A-5 | 69.4 | 1018 |
| A-6 | 69.6 | 1020 |
| A-7 | 69.8 | 1019 |
| A-8 | 70.2 | 1018 |
| A-9 | 71.6 | 1021 |
| A-10 | 70.3 | 1025 |
| A-11 | 68.9 | 1018 |
| A-12 | 71.2 | 1027 |
| A-13 | 68.8 | 1017 |
| A-14 | 70.2 | 1039 |
| A-15 | 68.8 | 1019 |
| A-16 | 70.6 | 1035 |
| DB-1 | 51.2 | 998 |
| DB-2 | 52.6 | 994 |
| DB-3 | 56.4 | 1003 |
| DB-4 | 55.2 | 992 |
| DB-5 | 54.5 | 1002 |
| DB-6 | 56.3 | 1000 |

Note:
Retaining of Relative Crystallinity = relative crystallinity (aged sample)/relative crystallinity (fresh sample) × 100%
Aging condition: aging at 800° C., under 100% water vapor for 2 h The analysis data in Table 3 demonstrates that, as compared to the comparative molecular sieves, the molecular sieves prepared according to the present invention have a molecular sieve collapse temperature increased by 15° C. or more, and a retaining ratio of relative crystallinity increased by 11.8% or more, which show that the preparation methods provided in accordance with the present invention can remarkably improve the thermal stability and hydrothermal stability of molecular sieves.

To investigate the heavy-oil-conversion capacity and the overall product distribution of the molecular sieves according to the present invention, experiments were conducted as follows: an FCC catalyst was prepared on the basis of a catalyst formulation of 35% molecular sieves (including the molecular sieves of the present invention and the comparative molecular sieves), 20% aluminum oxide, 8% alumina sol binder and 37% kaolin, by the conventional preparation method of semi-synthetic catalysts. The heavy oil microreactor activity was evaluated under the following evaluation conditions: the crude oil was Xinjiang catalytic material, the catalyst/oil ratio was 4, and the reaction temperature was 530° C. The evaluation results are shown in Table 4. The evaluation results show that the catalysts prepared using the type Y molecular sieves provided in accordance with the present invention as the active component have superior heavy oil conversion capacity and product selectivity.

and further allowing the rare earth ions in the super-cages to completely migrate into sodalite cages of the molecular sieve in the subsequent water-vapor calcination process, which is demonstrated by the observation that after ammonium exchanges of the molecular sieve, the rare earth content in the molecular sieve is not reduced, and there are no rare earth ions present in the filtrate. As rare earth ions are completely located in sodalite cages, framework dealumination in the water-vapor calcination process is suppressed, and the activity stability of the molecular sieve is improved. Also, due to the absence of rare earth ions in the molecular sieve super-cages or on the surface, the intensity and density of acidic centers in the molecular sieve pore channels are reduced, and the coke selectivity and the secondary utilization of active centers of the molecular sieve are increased. Moreover, the method greatly reduces the amount of ammonium salts used during the manufacture of the molecular sieves, and therefore represents a clean molecular sieve modification technique.

What is claimed is:

1. An ultra-stable rare earth type Y molecular sieve, wherein the ultra-stable rare earth type Y molecular sieve comprises 1% to 20% by weight of rare earth oxide and not more than 1.2% by weight of sodium oxide, and has a crystallinity of 51% to 69% and a lattice parameter of 2.449 nm to 2.469 nm;

TABLE 4

Evaluation results on ACE heavy oil microreactor activity

| | | Catalyst No. | | | | | | |
|---|---|---|---|---|---|---|---|---|
| | | 1 | 2 | 3 | 4 | 5 | 6 | 7 |
| Molecular Sieve | | A-1 | A-5 | A-10 | A-14 | DB-1 | DB-3 | DB-5 |
| Mass Balance | Dry gas | 2.97 | 2.79 | 2.84 | 3.03 | 2.75 | 2.75 | 2.76 |
| m % | Liquified gas | 23.52 | 23.03 | 23.66 | 24.51 | 21.81 | 22.33 | 21.54 |
| | Gasoline | 52.42 | 52.92 | 52.25 | 51.10 | 53.19 | 52.07 | 52.78 |
| | Diesel | 9.87 | 10.49 | 10.20 | 10.08 | 10.04 | 10.65 | 10.20 |
| | Heavy oil | 3.55 | 3.98 | 4.09 | 3.64 | 5.29 | 4.71 | 5.13 |
| | Coke | 7.68 | 6.80 | 6.96 | 7.65 | 6.92 | 7.49 | 7.59 |
| | Total | 100 | 100 | 100 | 100 | 100 | 100 | 100 |
| Conversion, m % | | 87.08 | 85.94 | 85.71 | 86.78 | 84.68 | 84.64 | 84.67 |
| Total liquid yield, m % | | 85.81 | 86.44 | 86.11 | 85.69 | 85.04 | 85.05 | 84.52 |
| Light oil yield, m % | | 62.29 | 63.41 | 62.45 | 61.19 | 63.23 | 62.72 | 62.98 |

In the present invention, NaY molecular sieves are used as raw materials, and no ammonium-containing solution is introduced during the first exchange and first calcination of the NaY molecular sieve, which prevents it from competing with rare earth ions and lowering the exchange utilization of rare earth ions. Moreover, the present invention employs a dispersing pre-exchange to reduce the exchange hindrance and allow rare earth ions to be localized in sodalite cages. Addition of one dispersing agent during the dispersing pre-exchange process is sufficient to produce the effects of the molecular sieves provided in accordance with the present invention, while addition of two or more dispersing agents may reduce the exchange hindrance in both the rare earth liquid phase and the ultra-stabilization process, thereby maximizing the cracking performance of the molecular sieves.

The method provided in accordance with the present invention can effectively reduce agglomeration of molecular sieve grains and increase the dispersibility of the molecular sieve, allowing rare earth ions to be completely exchanged into super-cages and sodalite cages of the molecular sieve, wherein the ultra-stable rare earth type Y molecular sieve is prepared from a NaY molecular sieve as a raw material, the preparation process of the ultra-stable rare earth type Y molecular sieve includes subjecting the raw material to a rare earth exchange and a dispersing pre-exchange to give a molecular sieve slurry, subjecting the molecular sieve slurry to filtration, washing, and a first calcination to afford a "one-exchange one-calcination" rare earth sodium Y molecular sieve, and subjecting the "one-exchange one-calcination" rare earth sodium Y molecular sieve to an ammonium salt exchange for sodium reduction and a second calcination, so as to obtain the ultra-stable rare earth type Y molecular sieve, wherein the order of the rare earth exchange and the dispersing pre-exchange is not limited, and the rare earth exchange and the dispersing pre-exchange are consecutively conducted without a calcination process therebetween;

wherein the dispersing pre-exchange comprises adjusting a slurry of the molecular sieve to a solid content of 80 to 400 g/L and adding 0.2% to 7% by weight of a dispersing agent, wherein dispersing pre-exchange is carried out at an exchange temperature of 0 to 100° C. for 0.1 to 1.5 h; the dispersing agent in the dispersing pre-exchange process is selected from one or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch; and wherein no ammonium salt is used in the rare earth exchange or the dispersing pre-exchange.

2. The ultra-stable rare earth type Y molecular sieve according to claim 1, wherein the dispersing agent in the dispersing pre-exchange process is selected from two or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch.

3. The ultra-stable rare earth type Y molecular sieve according to claim 1, wherein during the dispersing pre-exchange, the dispersing agent is added in an amount of from 0.2% to 5% by weight and the exchange temperature is 60 to 95° C.

4. A method of preparing an ultra-stable rare earth type Y molecular sieve comprising 1% to 20% by weight of rare earth oxide and not more than 1.2% by weight of sodium oxide, and has a crystallinity of 51% to 69% and a lattice parameter of 2.449 nm to 2.469 nm from a NaY molecular sieve as a raw material, the method comprising subjecting the raw material to a rare earth exchange and a dispersing pre-exchange to give a molecular sieve slurry, subjecting the molecular sieve slurry to filtration, washing, and a first calcination to afford a "one-exchange one-calcination" rare earth sodium Y molecular sieve, wherein the order of the rare earth exchange and the dispersing pre-exchange is not limited; and subjecting the "one-exchange one-calcination" rare earth sodium Y molecular sieve to an ammonium salt exchange for sodium reduction and a second calcination, so as to obtain an ultra-stable rare earth type Y molecular sieve, wherein the dispersing pre-exchange comprises adjusting a slurry of the molecular sieve to a solid content of 80 to 400 g/L and adding 0.2% to 7% by weight of a dispersing agent, wherein dispersing pre-exchange is carried out at an exchange temperature of 0 to 100° C. for 0.1 to 1.5 h; the dispersing agent in the dispersing pre-exchange process is selected from one or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch; and wherein no ammonium salt is used in the rare earth exchange or the dispersing pre-exchange.

5. The method of preparing the ultra-stable rare earth type Y molecular sieve according to claim 4, wherein the NaY molecular sieve has a silica-to-alumina ratio greater than 4.0, and a crystallinity greater than 70%.

6. The method of preparing the ultra-stable rare earth type Y molecular sieve according to claim 4, wherein during the rare earth exchange, $RE_2O_3$/Y zeolite is in a mass ratio of from 0.005 to 0.25, the exchange temperature is 0 to 100° C., the exchange pH is 2.5 to 6.0, and the exchange time is 0.1 to 2 h.

7. The method of preparing the ultra-stable rare earth type Y molecular sieve according to claim 6, wherein during the rare earth exchange, the mass ratio of $RE_2O_3$/Y zeolite is 0.01 to 0.20, the exchange temperature is 60 to 95° C., the exchange pH is 3.5 to 5.5, and the exchange time is 0.3 to 1.5 h.

8. The method of preparing the ultra-stable rare earth type Y molecular sieve according to claim 4, wherein the first calcination is carried out at 350 to 700° C. under 0 to 100% water vapor for 0.3 to 3.5 h.

9. The method of preparing the ultra-stable rare earth type Y molecular sieve according to claim 4, wherein the ammonium salt exchange and the second calcination of the "one-exchange one-calcination" ultra-stable rare earth sodium Y molecular sieve comprises:

adding the "one-exchange one-calcination" ultra-stable rare earth sodium Y molecular sieve into deionized water, adjusting the solid content thereof to 100 to 400 g/L to give a mixture, wherein $NH_4^+$/Y zeolite is in a mass ratio of 0.02 to 0.40, and the pH is 2.5 to 5.0;

allowing the mixture to react at 60 to 95° C. for 0.3 to 1.5 h, followed by subjecting the molecular sieve slurry to filtration and washing to give a filter cake; and calcinating the filter cake at 450 to 700° C. under 0 to 100% water vapor for 0.3 to 3.5 h.

10. The method of preparing the ultra-stable rare earth type Y molecular sieve according to claim 9, wherein the condition of the ammonium salt exchange of the "one-exchange one-calcination" ultra-stable rare earth sodium Y molecular sieve is as follows: the mass ratio of $NH_4^+$/Y zeolite is 0.02 to 0.30, and the pH is 3.0 to 4.5; and the filter cake is calcinated at 450 to 700° C. under 0 to 100% water vapor for 0.5 to 2.5 h.

11. The method of preparing the ultra-stable rare earth type Y molecular sieve according to claim 4, wherein the rare earth exchange and the dispersing pre-exchange comprise tank-type exchange, belt-type exchange and/or filter cake exchange.

12. The method of preparing the ultra-stable rare earth type Y molecular sieve according to claim 4, wherein the rare earth exchange comprises, dividing a solution of a rare earth compound into multiple portions and using the portions to carry out tank-type exchange, belt-type exchange and/or filter cake exchange, provided that the total amount of the dispersing agent is not changed.

13. The method of preparing the ultra-stable rare earth type Y molecular sieve according to claim 4, wherein the dispersing pre-exchange comprises, dividing the dispersing agent into multiple portions and using the portions to carry out tank-type exchange, belt-type exchange and/or filter cake exchange.

14. The method of preparing the ultra-stable rare earth type Y molecular sieve according to claim 4, wherein when the rare earth exchange and the dispersing pre-exchange are multiple exchanges, these two types of exchange are carried out alternately.

15. The method of preparing the ultra-stable rare earth type Y molecular sieve according to claim 4, wherein between the rare earth exchange and the dispersing pre-exchange of the NaY molecular sieve, the molecular sieve slurry is washed and filtered.

16. The method of preparing the ultra-stable rare earth type Y molecular sieve according to claim 4, wherein between the rare earth exchange and the dispersing pre-exchange of the NaY molecular sieve, the molecular sieve slurry is not washed or filtered.

* * * * *